Patented Sept. 14, 1937

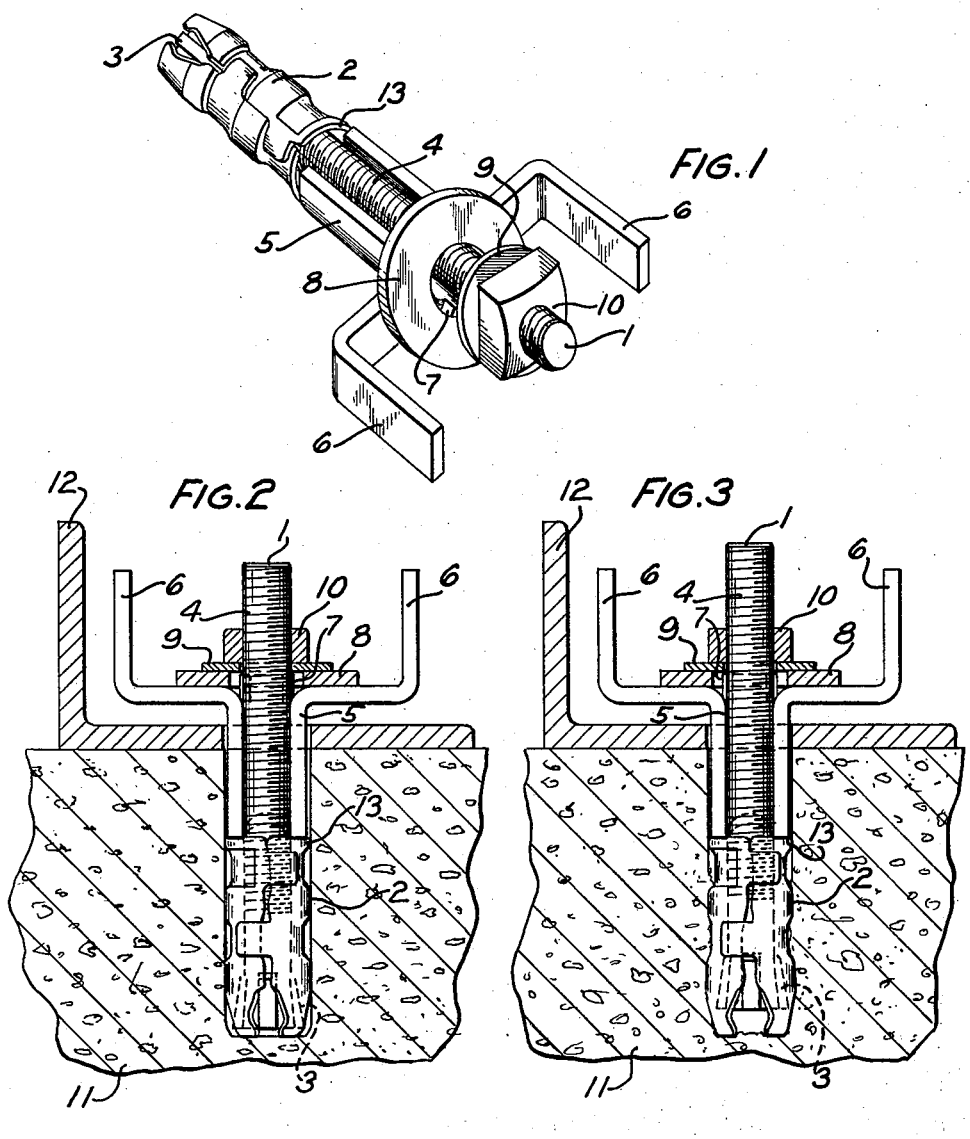

2,093,081

UNITED STATES PATENT OFFICE 2,093,081

TOOL

Lloyd R. Kalmbach, West Englewood, N. J., assignor to Western Electric Company, Incorporated, New York, N. Y., a corporation of New York Application April 1, 1936, Serial No. 72,005

3 Claims. (Cl. 29—88.2)

This invention relates to tools, and more particularly to tools for setting expansion bolts in which an expansible sleeve is employed.

An object of this invention is to provide a simple and inexpensive tool for installing expansion bolts securely and rapidly.

In accordance with one embodiment of the invention a tool comprises a channel shaped shank which partially surrounds the bolt and is utilized to set the bolt by applying pressure between an expansible sleeve and a nut on the bolt. A lug projecting from the shank is adapted for engagement with a washer on the bolt for retaining the tool and bolt in proper relationship during the setting operation.

Other objects and advantages of the invention will be apparent from the following detailed description taken in conjunction with the accompanying drawing, wherein Fig. 1 is a perspective view of an assembled bolt and tool embodying the invention;

Fig. 2 is an elevation, partly in section, showing the bolt, tool and mounting before the bolt is anchored;

Fig. 3 is a view similar to Fig. 2, showing the bolt after anchoring, and

Fig. 4 is a plan view of the tool.

Referring to the drawing, an expansion bolt 1 is provided with an expansible sleeve 2 mounted over a tapered shank 3 at one end of the bolt. The portion of the bolt not enclosed in the expansible sleeve is threaded as shown at 4 to receive nuts or similar means for securing objects to the bolt.

In the tool an elongated portion 5 with channel shaped cross section is adapted to engage and partially surround the threaded portion of the bolt 4. Two handles 6 extend laterally from the end of the channel shaped portion 5 with bent portions parallel to the axis of the channel and offset symmetrically therefrom. An arcuate shaped lug 7 forming an extension of the channel 5 projects between the two handles 6.

In the use of the above described tool the threaded portion of the bolt 4 is laid in the channel 5 with the end of the channel resting against the end of the expansible sleeve on the bolt 2 as shown at 13. A washer 8, which is provided with an aperture larger than the bolt section, is then placed over the threaded portion of the bolt and around the lug 7 to retain the tool in engagement with the bolt.

The washer 8 is secured in place with a supplementary washer 9 and a nut 10. The supplementary washer 9 which has an aperture only slightly larger than the bolt section encircles the bolt and rests against the washer 8. The nut 10 is turned on the threads 4 of the bolt a sufficient distance to lock the two washers, bolt and tool in position without expanding the sleeve and the device is then ready for insertion in an aperture.

The bolt shown is particularly adaptable for securing structural members 12 or other objects to a wall or base 11 of concrete, stone or similar materials not easily cut or deformed. Installation of the bolt in these materials can be accomplished as follows: An opening is made in the concrete base 11, preferably cylindrical in general form and slightly larger in diameter than the expansible sleeve on the bolt. The structural member 12 is then laid against the base with an opening therein in alignment with the opening in the base.

The bolt 1, mounted on the tool in accordance with the above description, is then inserted into the aligned openings and set by turning the nut 10 against the tool with a suitable wrench. This action applies a force against the end of the sleeve 2 at 13 which draws the tapered end of the bolt 3 into the sleeve, expanding the sleeve against the wall of the opening in the base. This holds the bolt securely in place as shown in Fig. 3. The handles on the tool 6 are used for gripping the assembly to prevent turning in the opening at the beginning of the expanding operation.

After the bolt is set the tool may be removed quickly and conveniently. To accomplish this the operator loosens the nut and spins it to a position near but not beyond the top of the thread. Next the two washers are lifted sufficiently on the bolt to clear the lug on the tool. The tool can then be tilted away from the anchored bolt and removed from the opening. The nut is then turned down tightly against the washers to complete the installation.

The tool described herein has been devised to facilitate manufacture at low cost. It can be produced from a single piece of material by a series of simple and rapid cutting and forming operations.

Although a specific embodiment of the invention has been described herein in detail, it is to be understood that other modifications and adaptations may be made without departing from the scope of the appended claims.

What is claimed is:

1. A tool for setting an expansion bolt provided with a washer having an aperture larger than the section of the bolt, by expanding a sleeve mounted on the bolt in an opening, comprising an elongated member adapted to extend substantially parallel to the bolt for engaging and effecting expansion of said sleeve, and a lug on said member adapted to engage said washer for positioning the tool during the setting operation.

2. A tool for setting an expansion bolt provided with a washer having an aperture larger than the section of the bolt, by expanding a sleeve mounted on the bolt in an opening, comprising a channel shaped member for supporting the bolt and engaging said sleeve, and a lug projecting from said channel shaped member to engage the aperture of said washer and retain the tool in engagement with the bolt during the setting operation.

3. A tool for setting expansion bolts provided with a washer comprising a central channel shaped shank for partially surrounding the bolt and engaging the expansible shield on the bolt, a pair of handles offset from the shank, and an arcuate lug extending between the handles and aligned with the shank for projecting into the aperture of the washer to retain the tool and bolt in engagement during the setting operation.

LLOYD R. KALMBACH.